Sept. 16, 1952 J. W. BARNES 2,610,509
GYROSCOPE

Filed Nov. 2, 1945 2 SHEETS—SHEET 1

JEFFERY WALTON BARNES
Inventor

BY Robert B. Larson
Attorney

Sept. 16, 1952    J. W. BARNES    2,610,509
GYROSCOPE

Filed Nov. 2, 1945    2 SHEETS—SHEET 2

JEFFREY WALTON BARNES
    Inventor

BY Robert B Larson
    Attorney

Patented Sept. 16, 1952

2,610,509

UNITED STATES PATENT OFFICE 2,610,509

GYROSCOPE

Jeffery Walton Barnes, Farnborough, England

Application November 2, 1945, Serial No. 626,361
In Great Britain May 16, 1942

Section 1, Public Law 690, August 8, 1946
Patent expires May 16, 1962

4 Claims. (Cl. 74—5.4)

The invention relates to gyroscopes and has for an object to provide improvements in gyroscopes which are required to afford a datum with reference to the earth.

A free gyroscope affords a datum with respect to space and, owing to the rotation of the earth, moves angularly relative to the earth at a rate of 360 cosine L degrees in 24 hours where L is the latitude at which the gyroscope is situated. It is an object of the invention to provide a convenient means for substantially reducing such relative movement or "apparent" wander of a gyroscope due to the rotation of the earth.

The pole strength of the magnet element employed will be so related to the speed of rotation of the gyroscope rotor, and to the mass of the gyroscope and associated parts partaking of its precessional movement that the gyroscope precesses with an angular velocity about the north-south axis of approximately 360 cosine L degrees per 24 hours. The cosine L term is automatically introduced because the strength of the horizontal component of the earth's magnetic field varies approximately with cosine L. To cause said precession to take place in the same direction as the earth's rotation, when the gyroscope is intended to operate with its spin axis vertical, it will be convenient to magnetise the spindle on which the gyroscope rotor is mounted, the arrangement being such that if the rotor rotates clockwise when viewed from above, the north pole of the magnetised spindle is uppermost. Alternatively a bar magnet parallel with the vertical spin axis may be mounted or incorporated in a frame carrying the gyroscope. When the gyroscope is intended to operate with its spin axis inclined to the vertical, a magnet may be mounted in the frame which carries the gyroscope and so arranged that its vertical when the gyroscope is erected. Further, a magnet may be mounted on a gimbal or universal joint and linked to the spindle of the gyroscope in such a way that it is vertical when the gyroscope is erected. A permanent bar magnet may for example be employed.

Figures 1, 3:
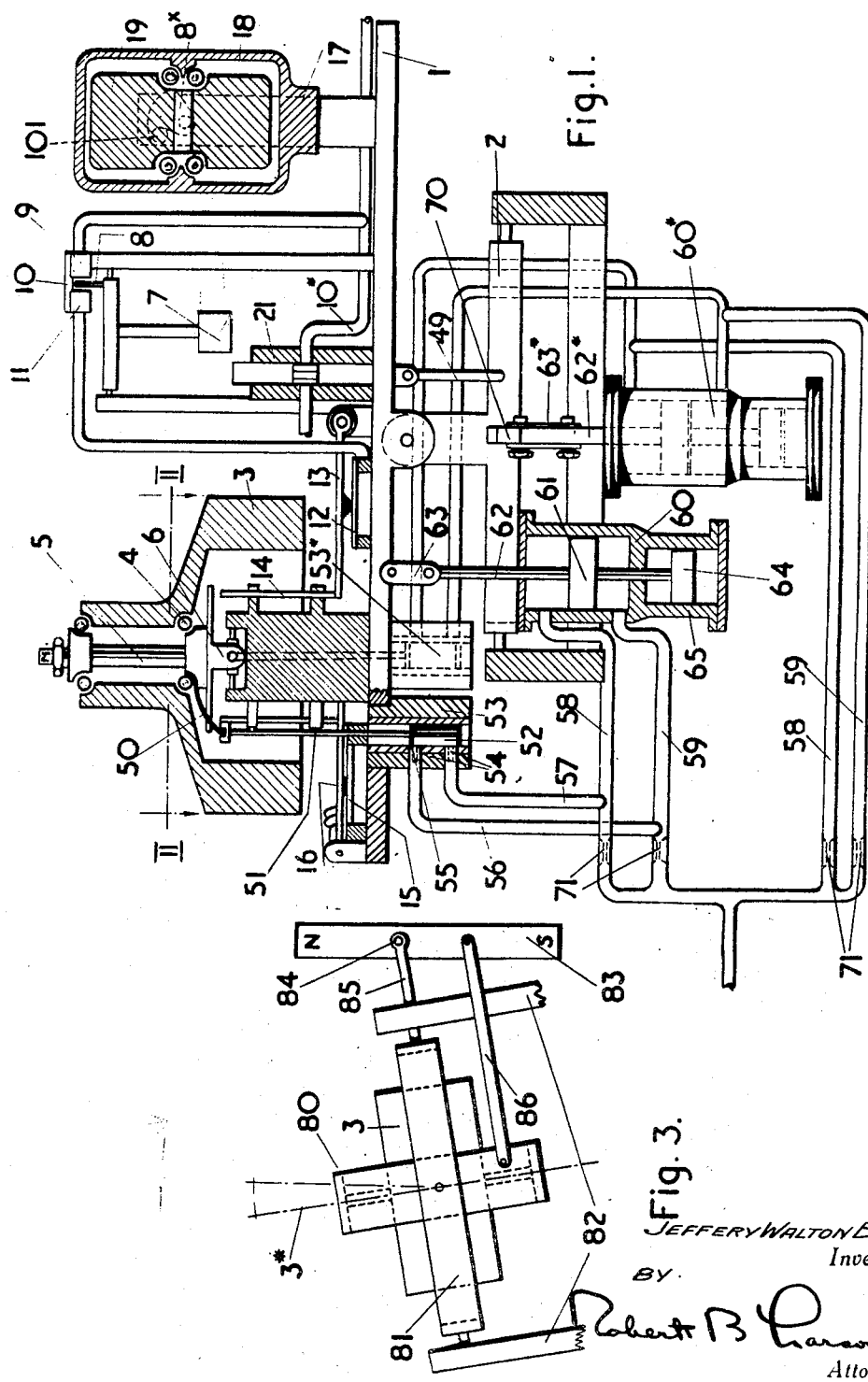
Figure 2:
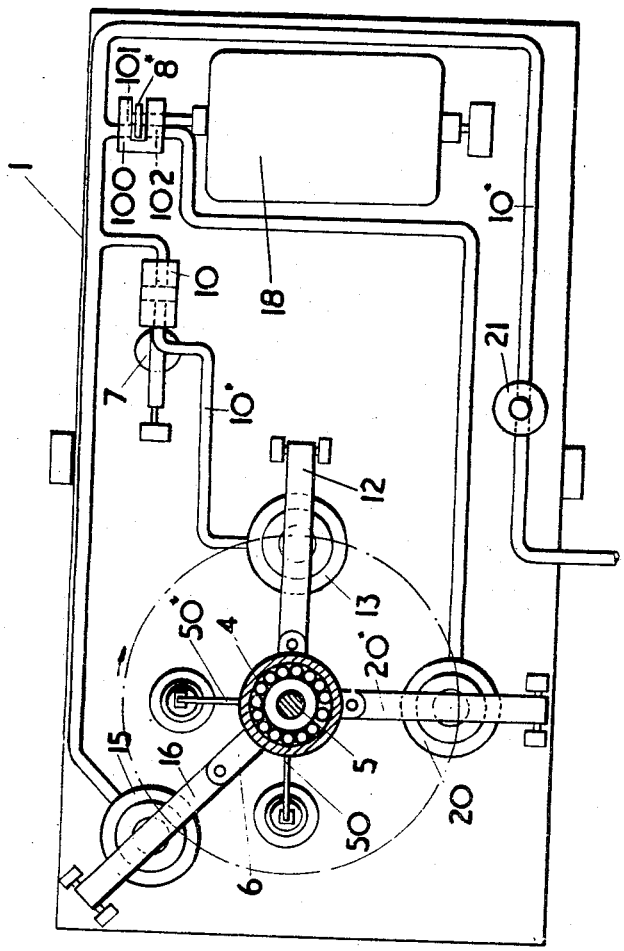

Figure 1 of the accompanying drawings shows in part sectional elevation looking in the direction of travel a gyroscopic apparatus intended for use on aircraft embodying the invention in one form, Figure 2 being a corresponding plan view partly in section on the line II—II of Figure 1, and Figure 3 illustrates a different form of the invention.

All three figures are diagrammatic and not necessarily to scale.

In the drawings corresponding parts are indicated by the same references throughout.

Referring to Figures 1 and 2, 1 indicates a platform to be stabilised to the horizontal. The platform is mounted in an aircraft on a universal joint generally indicated at 2 so as to be capable of rocking in any direction. 3 is the rotor of the free gyroscope carried in ball bearings 4 on a vertical spindle 5 which is mounted on the platform 1 by a universal joint 6.

The free gyroscope 3 may control the platform by any known servo means, one of which is illustrated by way of example. As illustrated the servo means comprises an arm 50 on the spindle 5 connected by the rod 51 to a valve 52 slidable in a cylinder 53 having ports 54, 55 communicating with by-pass pipes 56, 57 connected to pipes 58, 59 for supplying compressed air to a servo motor cylinder 60. The servo motor cylinder 60 contains a piston 61 connected by a piston rod 62 and link 63 to the platform 1. The piston 61 is connected to a piston 64 in a cylinder 65 containing fluid to act as a dashpot. Pipe lines 58, 59 from a supply (not shown) communicate with ports in the cylinder 60 above and below the piston 61 and the arrangement is such that when the valve 52 is moved by the gyroscope to uncover one port say 54, the compressed air in this pipe will escape and hence the pressure in the pipe 58 communicating with the upper side of the piston 61 will be reduced relative to that on the underside of the piston 61. The piston will rise and through the piston rod 62 and link 63 the platform will be tilted in a clockwise direction carrying the valve cylinder 53 with it until the piston 52 again closes port 54, when the servo motor will be stopped. If the piston 52 is moved to uncover the port 55, the system will act in a similar way but the piston 61 will in this case be lowered and the platform will be tilted in an anti-clockwise direction. The servo mechanism described will enable the platform to be controlled from the gyroscope in one plane, namely that of the drawing in Fig. 1 and this mechanism is duplicated to control the platform from the gyroscope in a plane at right angles by arranging the parts of this duplicate mechanism so that the arm 50* is at right angles to the arm 50, and that the piston rod 62* is connected by a link 63* to a lug 70 on the joint 2 at a point spaced apart from its bearings. The valve cylinder of of this duplicate mechanism is indicated at 53* and the servo motor at 60*. In order to prevent inter-action, constructions 71 are provided in the pipe lines at the supply side of inlet to the by-pass pipes. The gyroscope can be driven at high speed by air in the well known way.

A pendulum 7 supported on the platform 1 and sensitive to pitching of the aircraft has attached a small vane 8 which moves in a slot in a block 10 and partly interrupts the supply of compressed air through the pipe 10* passing from a jet 9 to a pick-up hole 11, whence it is conveyed to a flexible diaphragm 12 to which a lever 13 and push rod 14 are attached so that movement of the diaphragm 12 applies an erecting torque to the free gyroscope about the roll axis to precess it and therefore the platform 1 about the pitch axis.

A pendulous weight 17 is carried by a casing 18 containing a second gyroscope rotor 19 driven by air jets (not shown). This casing 18 is pivotally mounted on fore-and-aft horizontal pivots on the platform 1 and carries a vane 8* (Fig. 2) similar to vane 8 (Fig. 1). Vane 8* interrupts the compressed air passing from a jet 101 to a pick-up hole 102 in a block 100 similar to the block 10 and the collected pressure from which is directed to a diaphragm 20 which applies torque to the vertical spindle 5 about the pitch axis through a lever 20* and a push rod similar to the lever 13 and push rod 14, to precess the free gyroscope and, therefore, the platform 1 about the roll axis. The air supply to the jets 9 and 101 is applied also directly to a third diaphragm 15 connected, via a lever 16 and push rod similar to the lever 13 and push rod 14, to apply to the free gyroscope torque about an axis at 45 degrees to the roll and pitch axes and, therefore, torque components about said roll and pitch axes in opposition to the torques about said roll and pitch axes applied to the free gyroscope by the diaphragms 12 and 20. It will be seen that the vanes 8 and 8* will have positions for which the variable torque applied by diaphragms 12 and 20 will be exactly balanced by the roll and pitch components of the torque applied by diaphragm 16, and that when either vane moves this balance will be disturbed and precessing torque of corresponding sense and magnitude will be applied to the free gyroscope 3. The pendulum 17 will remain vertical during turns if the speed of rotation of the gyroscope rotor 19 is adjusted to suit the speed of the aircraft and the speed of rotation of the rotor 19 may be controlled by varying the pressure of the driving air jets. To prevent the results of serious speed errors being communicated to the free gyroscope during steeply banked turns of the aircraft a piston valve 21 is provided in the pipe 10*, the piston valve being connected to the gimbal 2 by the link 49. This valve will cut off the supply to the three diaphragms when the bank exceeds a predetermined minimum, say about 10 degrees.

The structure as described in the detailed discussion of the drawings up to this point is described and claimed in applicant's copending application, Serial No. 626,362, filed November 2, 1945.

As indicated by an arrow in Figure 2, the gyroscope rotor 3 rotates in a direction which is clockwise when viewed from above and in order that there shall be applied to the gyroscope by the earth's magnetic field such torque as will cause it to precess at a rate comparable to that of its inherent apparent wander due to the earth's rotation but in the opposite direction the spindle 5 is comprised by a permanent magnet of appropriate strength with its north seeking pole uppermost as indicated by the letter N, Figure 1.

Figure 3 illustrates an arrangement where the spin axis is inclined to the vertical when the gyroscope is erected as indicated at 3*. The rotor 3 is in this case supported by inner and outer gimbals 80, 81, the outer gimbal 81 is supported pivotally in a frame 82. A bar magnet 83 is pivotally mounted at 84 on an extension 85 of one bearing of the outer gimbal 81 and is connected to the inner gimbal 80 by a link 86 for pivotal movement with the rotor 3.

It will be appreciated that the invention is applicable to a wide variety of gyroscopic apparatus in which it is desirable that the apparent wander of a gyroscope due to the earth's rotation should be substantially reduced.

I claim:

1. In gyroscopic apparatus, a gyroscope, a magnetised element comprising the gyroscope rotor spindle, erecting means for said gyroscope, the polar axis of said magnetized element lying at a large angle to the horizontal when the gyroscope is erected, whereby apparent wander due to the earth's rotation is substantially reduced by the torque exerted via said magnetic element on the gyroscope by the earth's magnetic field.

2. In gyroscopic apparatus, a gyroscope, a magnetised element comprising the gyroscope rotor spindle, erecting means for said gyroscope, the polar axis of said magnetised element lying substantially vertical when the gyroscope is erected, whereby apparent wander due to the earth's rotation is substantially reduced by precession of the gyroscope as a result of the torque exerted via the magnetic element on the gyroscope by the earth's magnetic field.

3. Gyroscopic apparatus for defining the vertical in a moving craft, comprising a free gyroscope having its spin axis substantially vertical when erected, a servo system, a member stabilized by said free gyroscope and servo system and mounted to turn with the craft, means mounting the free gyroscope on said stabilized member, a pitch mass mounted pivotally on the stabilized member to tend to move about its pivot under the influence of gravity when pitch movement of the stabilized member occurs, means controlled by said pitch mass for applying torque to the free gyroscope to precess it in pitch, a roll mass mounted pivotally on the stabilized member to tend to move about its pivot under the influence of gravity when roll movement of the stabilized member occurs, means controlled by said roll mass for applying torque to the free gyroscope to precess it in roll, a second gyroscope mounted on the stabilized member to receive precessing torque from the craft during turning movement of the craft, said second gyroscope having a rotor mounted by bearings secured rigidly with the roll mass and with the rotor axis extending transversely of the yaw axis and of the axis of pivot of the roll mass, whereby compensating force is applied to said roll mass in opposition to the disturbing centrifugal force which acts thereon during turning movement of the craft, and said free gyroscope having a spindle comprised of a magnetic element, whereby the earth's magnetic field exerts torque via said magnetic element upon the gyroscope to cause the free gyroscope to precess at a rate comparable with the rate of its apparent wander due to the earth's rotation, and in the opposite direction.

4. Gyroscopic apparatus for defining the vertical in a moving craft, comprising a free gyroscope, a servo system, a member stabilized by said free gyroscope and servo system and mounted to turn with the craft, means mounting the free gyroscope on said stabilized member, a pitch mass mounted pivotally on the stabilized member to tend to move about its pivot under the influence of gravity when pitch movement of the stabilized member occurs, means controlled by said pitch mass for applying torque to the free gyroscope to precess it in pitch, a roll mass mounted pivotally on the stabilized member to tend to move about its pivot under the influence of gravity when roll movement of the stabilized member occurs, means controlled by said roll mass for applying torque to the free gyroscope to precess it in roll, a second gyroscope mounted on the stabilized member to receive precessing torque from the craft during turning movement of the craft, said second gyroscope having a rotor mounted by bearings secured rigidly with the roll mass and with the rotor axis extending transversely of the yaw axis and of the axis of pivot of the roll mass, whereby compensating force is applied to said roll mass in opposition to the disturbing centrifugal force which acts thereon during turning movement of the craft, and a magnetic element mounted and connected for angular movement with the free gyroscope, and being disposed at a large angle to the horizontal when the gyroscope is erected, whereby the earth's magnetic field exerts torque via said magnetic element upon the gyroscope to cause the free gyroscope to precess at a rate comparable with the rate of its apparent wander due to the earth's rotation, and in the opposite direction.

JEFFERY WALTON BARNES.

REFERENCES CITED

The following references are of record in the file of this patent:

UNITED STATES PATENTS

| Number | Name | Date |
|---|---|---|
| 1,545,479 | Boykow | July 14, 1923 |
| 2,219,243 | Kollsman | Oct. 22, 1940 |
| 2,293,039 | Esval | Aug. 18, 1942 |
| 2,363,500 | Carter et al. | Nov. 28, 1944 |
| 2,367,667 | Carter | Jan. 23, 1945 |
| 2,380,932 | Bates | Aug. 7, 1945 |
| 2,417,081 | Lynn | Mar. 11, 1947 |
| 2,418,032 | Jewell | Mar. 25, 1947 |
| 2,486,897 | Wendt | Nov. 1, 1949 |
| 2,501,885 | Barnes et al. | Mar. 28, 1950 |

FOREIGN PATENTS

| Number | Country | Date |
|---|---|---|
| 547,208 | Great Britain | Aug. 18, 1942 |